(12) United States Patent
Frick et al.

(10) Patent No.: US 10,273,326 B2
(45) Date of Patent: Apr. 30, 2019

(54) POLYESTER PREPOLYMERS AS IMPACT MODIFIERS IN EPOXY FORMULATIONS

(71) Applicant: SIKA TECHNOLOGY AG, Baar (CH)

(72) Inventors: Karsten Frick, Remetschwil (CH);
Ulrich Gerber, Uitikon-Waldegg (CH);
Jürgen Finter, Freiburg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/518,375

(22) PCT Filed: Oct. 13, 2015

(86) PCT No.: PCT/EP2015/073664
§ 371 (c)(1),
(2) Date: Apr. 11, 2017

(87) PCT Pub. No.: WO2016/059043
PCT Pub. Date: Apr. 21, 2016

(65) Prior Publication Data
US 2017/0240687 A1    Aug. 24, 2017

(30) Foreign Application Priority Data
Oct. 13, 2014 (EP) ................................... 14188632

(51) Int. Cl.
| C08G 18/10 | (2006.01) |
| C08G 18/80 | (2006.01) |
| C08G 18/69 | (2006.01) |
| C08G 18/75 | (2006.01) |
| C08J 9/32  | (2006.01) |
| C08G 18/42 | (2006.01) |
| C08J 9/10  | (2006.01) |
| C08G 59/40 | (2006.01) |
| C08G 18/08 | (2006.01) |
| C08G 18/40 | (2006.01) |
| C08G 18/58 | (2006.01) |
| C09J 175/08 | (2006.01) |

(52) U.S. Cl.
CPC ......... *C08G 18/8016* (2013.01); *C08G 18/10* (2013.01); *C08G 18/14* (2013.01); *C08G 18/4045* (2013.01); *C08G 18/42* (2013.01); *C08G 18/4216* (2013.01); *C08G 18/4233* (2013.01); *C08G 18/58* (2013.01); *C08G 18/698* (2013.01); *C08G 18/755* (2013.01); *C08G 59/4028* (2013.01); *C08J 9/103* (2013.01); *C08J 9/105* (2013.01); *C08J 9/32* (2013.01); *C09J 175/08* (2013.01); *C08J 2203/04* (2013.01); *C08J 2375/04* (2013.01); *C08J 2375/08* (2013.01)

(58) Field of Classification Search
CPC ...... C08L 23/06; C08L 23/12; C08L 23/0853; C08L 23/0869; C08L 23/02; C08L 2201/02; G02B 6/4436; H01B 3/447; H01B 3/441; H01B 3/46; H01B 3/448; H01B 13/14; H01B 7/0275; H01B 7/295; C09K 21/02

See application file for complete search history.

(56) References Cited

U.S. PATENT DOCUMENTS

| 3,317,463 | A |   | 5/1967  | Edward et al. |
| 3,912,559 | A | * | 10/1975 | Harigaya ........ H01L 21/823857 257/369 |
| 5,077,319 | A | * | 12/1991 | Wang ..................... C08J 9/0061 521/139 |
| 2004/0266558 | A1 | * | 12/2004 | Kuntimaddi ....... A63B 37/0003 473/373 |
| 2008/0269388 | A1 | * | 10/2008 | Markovich ............ B65D 53/00 524/210 |
| 2010/0240841 | A1 |   | 9/2010  | Shimura et al. |

FOREIGN PATENT DOCUMENTS

| CA | 1330143    | * | 6/1994  |
| DE | 1299416 B  |   | 7/1969  |
| DE | 1694046 A1 |   | 12/1969 |
| DE | 2346404 A1 |   | 4/1974  |
| DE | 19853813 A1|   | 6/1999  |

(Continued)

OTHER PUBLICATIONS

Takeichi, Tsutomu et al. "Preparation of High-Temperature Polyurethane by Alloying with Reactive Polyamide," Journal of Polymer Science: Part A: Polymer Chemistry, 2002, pp. 3497-3503, vol. 40.
Jan. 25, 2016 International Search Report issued with International Patent Application No. PCT/EP2015/073664.
Apr. 18, 2017 International Preliminary Report on Patentability issued with International Patent Application No. PCT/EP2015/073664.

*Primary Examiner* — Robert S Jones
(74) *Attorney, Agent, or Firm* — Oliff PLC (57) ABSTRACT

What is described is a polymer which is a polyurethane polymer having blocked isocyanate groups or a reaction product of said polyurethane polymer with at least one epoxy resin, where the polyurethane polymer having blocked isocyanate groups is an addition product formed from at least one polyisocyanate and at least one polyester polyol, wherein the isocyanate groups of the addition product have been blocked by reaction with at least one aromatic compound having at least one hydroxyl group. Such a polymer is suitable as an impact modifier in epoxy resin compositions, especially when they are used as adhesives or structural foams. The polymer improves the corrosion resistance and vertical expansion of the epoxy resin composition.

9 Claims, 1 Drawing Sheet

(56) References Cited

FOREIGN PATENT DOCUMENTS

| | | | |
|---|---|---|---|
| DE | 19935329 | A1 | 2/2001 |
| EP | 0307666 | A1 | 3/1989 |
| EP | 0308664 | A1 | 3/1989 |
| EP | 0363919 | A2 | 4/1990 |
| EP | 0363920 | A2 | 4/1990 |
| EP | 0308664 | B1 | 8/1991 |
| EP | 0950675 | A1 | 10/1999 |
| EP | 1967537 | A1 | 9/2008 |
| EP | 2062928 | A1 | 5/2009 |
| GB | 1244851 | * | 9/1971 |
| GB | 1399257 | * | 7/1975 |

* cited by examiner

POLYESTER PREPOLYMERS AS IMPACT MODIFIERS IN EPOXY FORMULATIONS

TECHNICAL FIELD

The invention relates to the field of impact modifiers and to the field of epoxy resin compositions.

PRIOR ART

Impact modifiers, also referred to as impact improvers or tougheners, are used in order to improve the strength of adhesives under impactlike exposure to force. Epoxy resin compositions in particular do generally have high mechanical strengths, but are very brittle, meaning that in the event of an impactlike exposure to force, of the kind occurring, for example, on collision of vehicles, the cured epoxy resin fractures, so leading to destruction of the bonded assembly.

The toughening or impact-strengthening and the flexibilizing of epoxy resin compositions have been trialed with various impact modifiers. Customary, for example, is the use of nanoscale rubber particles, liquid rubber, and polyurethane polymers. These impact modifiers do show an improvement in the impact strength properties of epoxy resin compositions, but have certain disadvantages.

The nanoparticles are decidedly expensive. The performance in terms of improving the impact strength properties, moreover, is small. Furthermore, their stability in twin-screw extruder processes is low.

Liquid rubbers have been used for some considerable time for impact modification. Liquid rubbers based on acrylonitrile/butadiene copolymers have been used, for example, of the kind available commercially under the name Hypro® from Emerald Performance Materials, LLC, USA, for example. Also known is the use of adducts of acrylonitrile/butadiene copolymers with solid epoxy resins, of the kind described for example in EP 0 308 664 B1.

Known epoxy resin compositions of this kind, with liquid rubbers or liquid-rubber adducts as impact modifiers, have proven disadvantageous especially when used on metallic surfaces, as is the case in vehicle construction, for example, where impact-modified epoxy resin compositions are employed as adhesives or as structural foams for reinforcement in cavities in structural components, being then referred to as "reinforcers". A primary reason for this is the inadequate aging resistance owing to corrosion which occurs in the region between the substrate surface and the adhesive or reinforcer. This so-called underfilm corrosion weakens the adhesive bond and leads to adhesive fracture of the bonded assembly.

EP 2 062 928 A1 likewise relates to liquid rubber-epoxy resin adducts as impact modifiers, exhibiting improved corrosion resistance. Nevertheless there is still a need for improvement, not least in terms of the mechanical properties. Furthermore, the production process is complicated and the production costs are relatively high.

The polyurethane polymers used as impact modifiers likewise exhibit low corrosion resistance. Furthermore, they are detrimental to foaming in the case of foamable epoxy resin compositions.

EP 0 308 664 A1 describes mixtures of specific diene copolymers and phenol-terminated polyurethanes or polyureas, which may include epoxy resins and/or adducts of epoxy resins.

Phenol-terminated polyurethanes or polyureas and epoxy resins which include these compounds are disclosed in EP 0 307 666 A1.

DE 2 346 404 deals with a method for joining surfaces to one another using adhesive compositions based on epoxy resins.

Polyamines containing urea groups are described in DE 199 35 329 A1.

EP 0 950 675 A1 discloses reactive systems based on a polyisocyanate component with blocked isocyanate groups and on a reactive component with primary amino groups.

U.S. Pat. No. 3,317,463 relates to methods for protecting reactive isocyanate groups with blocking agents.

DE 1 299 416 discloses aqueous adhesive dispersions for bonding rubber to fibrous materials, comprising a rubber latex and/or phenol-formaldehyde resins, and also reaction products of aromatic diisocyanates with polyether triols or trifunctional polyesters, or reaction products of aromatic polyisocyanates having at least three isocyanate groups with polyether glycols or difunctional polyesters.

A shape memory resin is described in US 2010/0 240 841 A1, wherein a polylactic acid derivative is crosslinked using a flexible polymer.

DE 1 694 046 deals with a method for producing moldings from castable polymers containing urethane groups, where, as reaction components, a hydroxyl polycaprolactone is reacted with naphthylene 1,5-diisocyanate in excess, the product being subsequently crosslinked using hydroquinone diglycol ether.

A shape memory sheet and a shape memory body, both formed from a transparent shape memory polymer, are disclosed in EP 0 363 919 A2 and EP 0 363 920 A2.

DE 198 53 813 A1 describes an adhesive which comprises two components A and B. Component A contains a functional group which is polymerizable by irradiation with UV rays, and a functional group which is capable of reaction with a compound containing an acidic hydrogen atom. Component B comprises two functional groups which are polymerizable by irradiation with UV light or with electron beams.

A method for producing shape memory bodies is disclosed in EP 1 967 537 A1.

In Takeichi et al., Journal of Polymer Science: Part A: Polymer Chemistry, volume 40, pages 3497-3503 (2002), the preparation of high-temperature polyurethanes by alloying with reactive polyamides is described.

SUMMARY OF THE INVENTION

It is an object of the present invention to provide impact modifiers which overcome the above-stated disadvantages of the known impact modifiers. The object more particularly was to provide impact modifiers which, in relation to the impact modifiers known from the prior art, lead in epoxy resin compositions to an improvement in impact strength and to an improvement in corrosion resistance with respect to subfilm corrosion, and hence also to an improvement in adhesion, especially to metallic surfaces. The impact modifiers in the case of foamable epoxy resin compositions, moreover, ought to improve the foaming properties.

Surprisingly it has been found that this object can be achieved by polymers as claimed in claim 1 or claim 2. These polymers act as impact modifiers (tougheners). In epoxy resin compositions, surprisingly, they help to achieve a dramatic improvement in the mechanical properties.

By using the impact modifiers of the invention in epoxy resin compositions it is possible in particular to improve the corrosion resistance, the adhesion, and the toughness or elongation at break, when, for example, the epoxy resin compositions are applied to substrates, such as metallic surfaces, for adhesive bonding or as structural foam. In the case of use in foamable epoxy resin compositions, furthermore, it has surprisingly been observed that the foam behavior is likewise improved.

The good corrosion outcomes are surprising, since the actual expectation for polyester polymers would have been degradation (hydrolysis) at elevated temperature under corrosion exposure. The use of such polymers in epoxy resin compositions results in substantially reduced subfilm corrosion, particularly in the context of adhesive bonding on or of metallic surfaces, and hence leads to a significantly stronger and more long-lived bonded assembly.

As far as the impact strength properties are concerned, surprisingly, the polymers of the invention are at least a match for the known liquid rubbers the preparation of such rubbers, however, is relatively complicated and therefore entails significantly higher costs.

The use of polyesters in the formulation without an advancement reaction brings no improvement in the mechanical properties. In accordance with the invention, the polyesters must be advanced beforehand. Since the polyesters are very readily available and hence also of economic interest, an effective and efficient solution is at hand for improving the mechanical properties of brittle epoxy resin compositions.

Further aspects of the invention are 1K and 2K [1- and 2-component, respectively] epoxy resin compositions which comprise these polymers, the corresponding use of the polymers, and also processes for preparing the polymers, each of which are subjects of further independent claims. Particularly preferred embodiments of the invention are subjects of the dependent claims. All of the details below are applicable, where possible, equally to the inventive polymers, epoxy resin compositions, uses, and processes.

BRIEF DESCRIPTION OF THE DRAWINGS

One particularly preferred application example of the invention is elucidated in more detail using the drawings. In the different figures, identical elements are given the identical reference symbols. The invention is of course not confined to application examples that are shown and described.

In the drawing

Only the elements that are essential for immediate understanding are shown in the figures.

Certain Embodiments Of The Invention

The term "polymer" in the present document encompasses on the one hand a collective of chemically uniform macromolecules which nevertheless differ in general in terms of degree of polymerization, molar mass, and chain length, said collective having been prepared by means of a polymerization reaction (addition polymerization, polyaddition, polycondensation). On the other hand, the term also encompasses derivatives of such a collective of macromolecules from polymerization reactions, i.e., compounds which have been obtained by reactions—such as additions or substitutions, for example—of functional groups on specified macromolecules, and which may be chemically uniform or chemically nonuniform. The term, furthermore, also encompasses what are called prepolymers, these being reactive oligomeric or polymeric precursors whose functional groups are participants in the construction of macromolecules.

Substance names beginning with "poly", such as polyol or polyisocyanate for example, refer in the present document to substances which in formal terms include per molecule two or more of the functional groups that occur in their name. The term "terminated" relates to the two end groups in a polymer. A hydroxyl-terminated polymer is, therefore, a polymer having two hydroxyl end groups.

The terms "solid epoxy resin" and "liquid epoxy resin" are very well known to a person skilled in the art of epoxide. The glass transition temperature, $T_g$, of the solid epoxy resins is above room temperature of 25° C.—in other words, they can be comminuted to pourable particles at room temperature. Liquid epoxy resins, correspondingly, have a $T_g$ of not more than 25° C.

The glass transition temperature $T_g$ of epoxy resins can be determined by differential scanning calorimetry (DSC).

The term "diphenol" in the present document refers to monocyclic, polycyclic, and fused aromatics and heteroaromatics which contain two phenolic hydroxyl groups. Hydroxyl groups bonded on an aromatic ring carbon atom are referred to here as phenolic hydroxyl groups. The phenolic hydroxyl group may be bonded an aryl ring, as for example on a phenyl, naphthyl, anthryl or phenanthryl ring.

The present invention relates in a first aspect to a polymer which is a polyurethane polymer containing blocked isocyanate groups or is a reaction product of the polyurethane polymer containing blocked isocyanate groups with at least one epoxy resin, where the polyurethane polymer containing blocked isocyanate groups is an adduct of at least one polyisocyanate and at least one polyester polyol, the isocyanate groups of the adduct being blocked by reaction with at least one aromatic compound which contains at least one hydroxyl group.

The polymer of the invention which is a polyurethane polymer containing blocked isocyanate groups or a reaction product of the polyurethane polymer containing blocked isocyanate groups with at least one epoxy resin has a solid aggregate state, preferably, at room temperature (25° C.). This facilitates the handling of such polymers considerably in comparison to polymers which at room temperature are liquid or even highly viscous.

Described first of all below are the starting components for preparing the polymers of the invention, and then the preparation of the polymers.

One polyisocyanate or a mixture of two or more polyisocyanates can be used. The polyisocyante has two or more isocyanate groups. The polyisocyanate is preferably a diisocyanate or triisocyanate, more preferably a diisocyanate. Polyisocyanates used may be aliphatic, cycloaliphatic or aromatic polyisocyanates, more particularly diisocyanates.

Examples of particularly suitable polyisocyanates are 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate and mixtures of these isomers, 1-methyl-2,4- and -2,6-diisocyanatocyclohexane and mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or H12MDI), 1,4-diisocyanato-2,2,6-trimethylcyclohexane (TMCDI), 1,3- and 1,4-bis (isocyanato-methyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-tolylene diisocyanate and mixtures of these isomers (TDI), 4,4'-, 2,4'-, and 2,2'-diphenylmethane diisocyanate and mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODD, dianisidine diisocyanate (DADI), norbornane diisocyanate, and also oligomers, such as biurets or isocyanurates, for example, and polymers of the aforesaid monomeric polyisocyanates, and mixtures of the aforesaid polyisocyanates.

Monomeric diisocyanates are preferred. Highly suitable for example are MDI, TDI, HDI, XDI, norbornane diisocyanate, and IPDI.

It is possible to use one polyester polyol or a mixture of two or more polyester polyols. The polyester polyol has two or more hydroxyl groups, preference being given to a polyester polyol having two hydroxyl groups. The polyester polyol is preferably a hydroxy-terminated polyester polyol. The polyester polyol is preferably a linear polyester polyol, more particularly a hydroxy-terminated linear polyester polyol.

The polyester polyol preferably has an average molecular weight in the range from 1000 to 10 000 g/mol.

The average molecular weight of the polyester polyol may be calculated on the basis of the sum of the hydroxyl number and of the acid number of the polyester polyol. The hydroxyl number can be determined in accordance with DIN 53 240-02 and the acid number in accordance with DIN EN ISO 2114.

The polyester polyol is preferably solid at room temperature (25° C.). The melting point of the polyester polyol is preferably greater than 40° C. and more preferably greater than 50° C. The melting point can be determined by DSC analysis (DSC=Differential Scanning calorimetry) in accordance with DIN 53765 at a heating rate of 20° C/min. On account of improved reproducibility it is customary to determine the melting point in the course of a second heating procedure.

The polyester polyol is obtainable for example from the reaction of one or more dihydric to trihydric alcohols with one or more organic dicarboxylic acids or anhydrides or esters thereof, or from the polymerization of lactones such as ε-caprolactone, for example.

Examples of suitable dihydric or trihydric alcohols are 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane.

Examples of suitable organic dicarboxylic acids are succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or their anhydrides or esters.

The polyester polyol is preferably formed from at least one aliphatic or aromatic $C_3$-$C_{12}$ diol, preferably at least one aliphatic $C_3$-$C_{12}$ diol, such as 1,6-hexane-diol, for example, and from at least one aliphatic or aromatic $C_3$-$C_{15}$ dicarboxylic acid, such as dodecanedicarboxylic acid and/or terephthalic acid, for example, or the methyl ester thereof. Aliphatic includes linear aliphatic and cycloaliphatic, preference being given to linear aliphatic.

The aromatic compound for blocking the isocyanate groups of the adduct comprises at least one hydroxyl group. The one or more hydroxyl groups may each independently of one another be bonded on an aliphatic carbon atom or preferably on an aromatic ring carbon atom.

The aromatic compound preferably has the formula (I)

HO—$R^4$       (I)

in which the radical $R^4$ in the formula (I) is an alkylaryl group or is a monocyclic, polycyclic or fused aromatic radical which optionally has one or more phenolic hydroxyl groups. The alkyl of the alkylaryl group may be $C_{1-4}$ alkyl, for example. The monocyclic, polycyclic or fused aromatic radical may comprise one or more aryl groups. The aryl groups are preferably phenyl, naphthyl, anthryl or phenanthryl, more preferably phenyl. These aryl groups, and the alkylaryl group as well, may comprise one or more substituents.

The aromatic compound or the compound of the formula (I) more preferably has the formula (II)

X1—[Ar1—R1]$_n$—Ar2—[R2]$_m$—OH     (II)

in which
X1 is OH or H,
Ar1 and Ar2 independently of one another are a divalent aryl group, preferably phenylene, naphthylene, anthrylene or phenanthrylene, more particularly phenylene, which is optionally substituted by one or more substituents, the substituents being preferably selected from COOH, alkyl, e.g., $C_{1-18}$ alkyl, preferably $C_{1-4}$ alkyl, alkenyl, e.g., $C_{1-18}$ alkenyl, alkoxy, e.g., $C_{1-4}$ alkoxy, phenyl, optionally substituted by alkyl, more particularly $C_{1-4}$ alkyl, and/or by OH, and hydroxyl,
R1 and R2 independently of one another are a divalent alkyl group, preferably $C_{1-4}$ alkylene, more particularly methylene, which is optionally substituted by one or more substituents, the substituents being preferably selected from COOH, alkyl, e.g., $C_{1-18}$ alkyl, preferably $C_{1-4}$ alkyl, alkenyl, e.g., $C_{1-18}$ alkenyl, alkoxy, e.g., $C_{1-4}$ alkoxy, phenyl, which is optionally substituted by alkyl, more particularly $C_{1-4}$ alkyl, and/or by OH, and R1 may also be a single bond,
n is 0, 1 or 2, preferably 0 or 1, and
m is 0 or 1, preferably 0.

The aromatic compound having at least one hydroxyl group, or the aromatic compound of the formula (II), is preferably a diphenol, more particularly a bisphenol such as bisphenol A or bisphenol F, an alkyl-substituted phenol, an alkenyl-substituted phenol or an alkoxy-substituted phenol. The alkyl, alkenyl, and alkoxy may be substituted, as for example by an aryl group such as phenyl. The alkyl-substituted, alkenyl-substituted or alkoxy-substituted phenol may have one or more, preferably one, alkyl, alkenyl or alkoxy substituent, respectively. The alkyl, alkenyl or alkoxy substituent has preferably 1 to 20 C atoms.

Preferred examples of the aromatic compound which contains at least one hydroxyl group are phenol, cresol, p-tert-butylphenol, Cardolite NC-700 (3-pentadecenylphenol (from cashew nut shell oil)), nonylphenol, allylphenol, hydroquinone monomethyl ether, p-hydroxybenzoic acid, benzyl alcohol, hydroxybenzyl alcohol, and bisphenols or diphenols, such as phenols reacted with styrene or dicyclopentadiene, for example, bisphenol A, bisphenol F, phenolphthalein, 4-bis(4-hydroxyphenyl)valeric acid, and 4-cumylphenol.

The aromatic compound which contains at least one hydroxyl group, or the aromatic compound of the formula (I) or of the formula (II), is more preferably an aromatic compound which contains one or two phenolic OH groups. Where the aromatic compound contains two phenolic OH groups (diphenols), the two phenolic OH groups may be bonded on an aryl group, more particularly a phenyl group, or on two different aryl groups, more particularly phenyl groups.

The epoxy resin which is optionally reacted with the polyurethane polymer containing blocked isocyanate groups in order to form the reaction product may be any customary epoxy resin known to the person skilled in the art. Epoxy resins generally have on average at least 2 epoxide groups in the molecule. The epoxy resin may be at least one solid epoxy resin, at least one liquid epoxy resin or at least one novolac epoxy resin, or a mixture of these epoxy resins.

A suitable solid epoxy resin is preferably a solid epoxy resin of the formula (III)

(III)

In the formula (III), p has a value of ≥2, more particularly of 2 to 12, preferably of 2 to 7.

The radical D independently at each occurrence is a divalent radical of a diphenyl after removal of the two hydroxyl groups. Particularly suitable diphenols are those selected from the group consisting of 1,4-dihydroxy-benzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl) methane (=bisphenol F), bis(4-hydroxyphenyl) sulfone (=bisphenol S), naphthoresorcinol, dihydroxynaphthalene, dihydroxyanthra-quinone, dihydroxybiphenyl, 3,3-bis(p-hydroxyphenyl)phthalides, 5,5-bis(4-hydroxyphenyl)hexahydro-4,7-methanoindane, phenolphthalein, fluorescein, 4,4'[bis(hydroxyphenyl)-1,3-phenylenebis(1-methylethylidene)] (=bisphenol M), 4,4'-[bis-(hydroxyphenyl)-1,4-phenylenebis(1-methyl-ethylidene)] (=bisphenol P), 2,2'-diallylbisphenol-A, diphenols and dicresols prepared by reaction of phenols or cresols with diisopropylidenebenzene, and also all isomers of the aforesaid compounds.

The radical $R^5$ independently at each occurrence is a hydrogen atom or is a methyl group.

The solid epoxy resin is preferably a solid bisphenol A epoxy resin, a solid bisphenol F epoxy resin or a mixture thereof.

A suitable liquid epoxy resin is preferably a liquid epoxy resin of the formula (IV)

In the formula (IV) the radicals $R^{5'}$, $R^{11}$ and $R^{12}$ independently of one another are either H or $CH_3$. Additionally the index r has a value of 0 to 1. Preferred liquid epoxy resins have a value for r of ≤0.2.

The resins are therefore preferably diglycidyl ethers of bisphenol A (BADGE), of bisphenol F (BFDGE), and of bisphenol A/F. The designation 'A/F' here refers to a mixture of acetone with formaldehyde which is used as a reactant in the preparation of said ether. Liquid resins of these kinds are available commercially, for example, under the trade names Araldite® GY 250, Araldite® PY 304, and Araldite® GY 282 from Huntsman International, LLC, USA, or D.E.R.® 331 or D.E.R.® 330 from The Dow Chemical Company, USA, or under the trade names Epikote® 828 or Epikote® 862 from Hexion Specialty Chemicals Inc., USA.

The epoxy resin may further be a novolac epoxy resin, which is a phenolic resin containing epoxide groups. Preference in that case is given to novolac epoxy resins prepared from a polycondensation reaction of phenol or cresol with formaldehyde, in a stoichiometric ratio of phenol to formaldehyde of ≥1:1, more particularly of 1.2:1 to 2:1, using usually acidic catalysts, and subsequent reaction of the resultant polyphenol (also called novolac) with epichlorohydrin and/or 2-methylepichlorohydrin.

Novolac epoxy resins of these kinds are available commercially, for example, under the trade names D.E.N™ 431 and D.E.N™ 438 from The Dow Chemical Company, USA.

In an optional and preferred embodiment, the reaction product of at least one epoxy resin with at least one polyurethane polymer containing blocked isocyanate groups may additionally have been reacted at least partially with a polymer containing carboxyl groups, preferably a carboxyl-terminated polymer. The polymer containing carboxyl groups is preferably a carboxyl-terminated butadiene/acrylonitrile copolymer. The polymer containing carboxyl groups or the carboxyl-terminated butadiene/acrylonitrile copolymer is preferably a liquid rubber.

The polymer containing carboxyl groups is preferably a carboxyl-terminated polymer of the formula (V)

(V)

where $R^1$ is a divalent radical of a carboxyl-terminated butadiene/acrylonitrile copolymer after removal of the terminal carboxyl groups.

The radical $R^1$ in the formula (V) is more particularly a divalent radical of the formula (VI)

(IV)

The dashed lines here represent the bonds to the two carboxyl groups of the formula (V). a represents the structural element which originates from acrylonitrile, and b and c the structural elements which originate from butadiene.

The radical $R^{10}$ is a linear or branched alkylene radical having 1 to 6 C atoms, more particularly having 4 or 5 C atoms, which is optionally substituted by unsaturated groups.

Furthermore, the index q has a value of between 40 and 100, more particularly between 50 and 90, preferably between 52 and 66, most preferably between 54 and 62. The indices s, t, and u in turn represent values which describe the relation of the structural elements a, b, and c to one another. The index s has values from 0.05 to 0.3, more particularly from 0.1 to 0.25, preferably from 0.1 to 0.2, most preferably from 0.1 to 0.18; the index t has values from 0.5 to 0.8, more particularly from 0.6 to 0.7; and the index u has values from 0.1 to 0.2, more particularly from 0.13 to 0.15, with the proviso that the sum of s, t and u is 1.

To the person skilled in the art it is clear that the structure shown in formula (VI) should be understood as a simplified representation. Accordingly, the structural elements identified with a, b, and c may in each case have a random, alternating or blockwise arrangement relative to one another.

The radical $R^1$ is more preferably a radical as obtainable after the formal removal of carboxyl groups from a carboxyl-terminated butadiene/acrylonitrile copolymer sold commercially under the trade name Hypro® CTBN by Emerald Performance Materials, LLC, USA.

In a second aspect, the invention encompasses a process for preparing the polymers of the invention, the process comprising the following steps:
a) reacting at least one polyisocyanate with at least one polyester polyol, optionally in the presence of a catalyst, to give an adduct in the form of a polyurethane polymer containing isocyanate groups,
b) reacting the polyurethane polymer containing isocyanate groups with at least one aromatic compound which contains at least one hydroxyl group, to block the isocyanate groups, and
c) optionally reacting the polyurethane polymer containing blocked isocyanate groups with at least one epoxy resin, optionally in the presence of a catalyst.

In an optional and preferred variant, a polymer containing carboxyl groups, preferably a carboxyl-terminated butadiene/acrylonitrile copolymer, may be added and included in reaction in step c) or after step c), to give a modified reaction product. In the case of this optional variant it is preferable for the polyurethane polymer containing blocked isocyanate groups to be reacted in step c) together with the polymer containing carboxyl groups, preferably the carboxyl-terminated butadiene/acrylonitrile copolymer, with at least one epoxy resin, optionally in the presence of a catalyst.

The overall process can be carried out as a one-pot reaction, meaning that the product mixture obtained in each stage can be used, without further processing, in the next stage. All or individual reaction stages may optionally be carried out as and when required under inert gas atmosphere or, preferably, under reduced pressure.

In a first step the at least one polyisocyanate and the at least one polyester polyol are reacted, optionally in the presence of a catalyst, to give an adduct in the form of a polyurethane polymer containing isocyanate groups. In the case of high-melting polyester polyols having a melting point of more than 100° C., it is possible, for example, to do without a catalyst (e.g., DBTL).

The adduct obtained is preferably an isocyanate-terminated polyurethane prepolymer. The adduct obtained represents an ester-urethane polymer of enhanced flexibility.

The at least one polyisocyanate and the at least one polyester polyol are reacted in a ratio such that the isocyanate groups of the polyisocyanate are in a stoichiometric excess over the hydroxyl groups of the polyester polyol. The molar ratio of the isocyanate groups of the polyisocyanate to the hydroxyl groups of the polyester polyol here is preferably at least 2 and is situated preferably in the range from 2.05 to 2.1.

Such reactions of polyisocyanates with polyols, and also the reaction conditions for them, are highly familiar to the person skilled in the art. Depending on the melting point of the polyester polyol, the reaction takes place typically at relatively high temperatures, e.g., at least 90° C., preferably in the range from 100 to 130° C. Catalysts suitable for the reaction are optionally used. Examples of suitable catalysts are organic Sn compounds, such as DBTL (dibutyltin dilaurate), for example.

Since the polyester polyol is generally solid at room temperature, it is first of all melted and optionally a catalyst is added. Then the polyisocyanate is mixed in and reaction takes place preferably at elevated temperature. The reaction time may be situated, for example, in a period of 60 to 120 minutes.

The reaction mixture obtained, with the polyurethane polymer containing isocyanate groups, can be used without further processing for the second step.

In the second step, the polyurethane polymer containing isocyanate groups and formed above is reacted with the at least one aromatic compound which contains at least one hydroxyl group, in order to block the isocyanate groups of the polyurethane polymer formed. The at least one aromatic compound which contains at least one hydroxyl group can simply be added to the reaction mixture after the end of the addition reaction in the first step.

The at least one aromatic compound which contains at least one hydroxyl group is preferably added to the polyurethane polymer containing isocyanate groups in an amount such that the hydroxyl groups of the aromatic compound are in a stoichiometric excess over the isocyanate groups of the polyurethane polymer containing isocyanate groups, or of the reaction mixture which includes this polymer. The molar ratio of hydroxyl groups to isocyanate groups is preferably at least 2.05 and is situated more preferably in the range from 2.05 to 3. When using an aromatic compound having one hydroxyl group, more particularly a monophenol, the molar ratio of hydroxyl groups to isocyanate groups is preferably approximately in the range from 2.05 to 2.15. When using an aromatic compound having two hydroxyl groups, more particularly a bisphenol, the molar ratio of hydroxyl groups to isocyanate groups is preferably approximately in the range from 2.05 to 3.

Reactions of hydroxyl compounds with isocyanate compounds and also the reaction conditions for them are very familiar to the person skilled in the art. The reaction takes place typically at relatively high temperatures, e.g., at least 100° C., preferably in the range from 120° C. to 150° C. Additional catalysts are optionally used for the reaction.

The reaction time may be situated, for example, in a period of 2 to 6 h. The progress of the reaction may be monitored by determining the isocyanate content of the reaction mixture. The isocyanate content after conclusion of the reaction ought to be below 0.2%, for example.

In reaction scheme 1 below, the reaction products between the polyester polyol and the polyisocyanate and also between the resultant polyurethane polymer containing isocyanate groups and the aromatic compound are illustrated schematically, the aromatic compound containing one phenolic OH group. All reaction schemes given are exemplary and serve to illustrate the invention, and are not intended to limit the scope of the invention. For example, the polyurethane polymer may also have a higher degree of polymerization and may contain, for example, two or more polyester polyol units and, accordingly, more polyisocyanate units.

removal of the terminal hydroxyl groups, Y is the divalent radical of a diisocyanate after removal of the terminal isocyanate groups (typically IPDI), and Z represents schematically one or more possible substituents or the remainder of the aromatic compound (typically BPA).

Where the aromatic compound has two or more reactive OH groups, one or more reactive groups remain after the addition reaction with an isocyanate group. Where the aromatic compound, for example, is a difunctional compound, it is optionally possible up to a certain degree, depending on the proportions of the starting materials, for a further chain extension to take place with, for example, unreacted polyisocyanate.

Reaction scheme 2 below illustrates schematically the reaction sequence when a difunctional aromatic compound Reaction scheme 1

In reaction scheme 1, R is a polyester chain, X is the divalent radical of a diol (typically 1,6-hexanediol) after (bisphenol A) is used, also including a possible chain extension via unreacted polyisocyanate.

Reaction scheme 2

The place holders R, X, and Y are defined as in reaction scheme 1. R' and R", in the context of the possible chain extension with excess polyisocyanate, provide a simplified representation of the remainder of the polymer chain. The possible reaction shown with the polyisocyanate is merely an illustration of the principle and not a reproduction of a stoichiometric reaction. For the second isocyanate group of the polyisocyanate, different reaction partners in the mixture may come into question.

The resulting polyurethane polymer containing blocked isocyanate groups can be used as it is, without further processing, as impact modifier in epoxy resin compositions, as elucidated in detail later on. Under the curing conditions of epoxy resin compositions, the aromatic protective groups of the polyurethane polymer containing blocked isocyanate groups may be eliminated, hence allowing the deblocked isocyanate groups to react with hydroxyl groups present in the epoxy resin. This so-called crosslinking reaction with the epoxy resin improves the aging characteristics and impact-toughness characteristics of the cured product.

In an alternative and preferred embodiment, the resulting polyurethane polymer containing blocked isocyanate groups may further be reacted with at least one epoxy resin, optionally in the presence of a catalyst.

Where the reaction with the epoxy resin is to take place, the resulting reaction mixture with the polyurethane polymer containing blocked isocyanate groups may be used without further processing, for the optional third step. The epoxy resin may therefore, after reaction has taken place, be introduced directly in the second-stage reaction mixture.

As already elucidated above, the epoxy resin may for example be at least one solid epoxy resin, at least one liquid epoxy resin or at least one novolac epoxy resin, or a mixture of these epoxy resins. For example, a mixture of at least one solid epoxy resin with at least one novolac epoxy resin, or a mixture of at least one solid epoxy resin with at least one liquid epoxy resin, may be used. Mixtures of at least one solid epoxy resin with at least one liquid epoxy resin may also be used.

With regard to the polyurethane polymer containing blocked isocyanate groups, the at least one epoxy resin is used preferably in an amount such that there is a stoichiometric excess of epoxide groups (epoxirane groups) to hydroxyl groups, more particularly phenolic hydroxyl groups, with the molar ratio of epoxide groups to hydroxyl groups, more particularly phenolic hydroxyl groups, being preferably at least 2:1 and being situated more preferably in the range from 3:1 to 10:1.

Reactions of this kind, of blocked polyisocyanates with epoxy resins, and also the reaction conditions for them, are very familiar to the person skilled in the art. The reaction takes place typically at relatively high temperatures, e.g., at not less than 100° C., preferably in the range from 110 to 130° C. Catalysts suitable for the reaction are optionally used. Examples of suitable catalysts are phosphines, such as triphenylphosphine (TPP), for example, in a fraction for example of 0.05-0.1 wt %, based on the total weight of the reaction mixture.

The reaction time may be situated for example in a period from 2 to 5 h. The reaction is monitored via titration of epoxide.

In the reaction of the epoxy resins with the polyurethane polymer containing blocked isocyanates, there is at least partial elimination of the aromatic protective groups, and reaction of the liberated isocyanate group with the epoxy resin. This reaction takes place in general with hydroxyl groups in the epoxy resin.

In an optional embodiment the reaction product obtained from the at least one epoxy resin with the polyurethane polymer containing blocked isocyanate groups may additionally be modified at least partially, preferably partially, with a polymer containing carboxyl groups, preferably a carboxyl-terminated butadiene/acrylonitrile copolymer, which is preferably a liquid rubber.

The reaction product of the at least one epoxy resin with the polyurethane polymer containing blocked isocyanate groups, is modified preferably in excess with the polymer containing carboxyl groups, preferably a carboxyl-terminated butadiene/acrylonitrile copolymer, i.e., a stoichiometric excess of the epoxide groups in the epoxy resin used over the carboxyl groups of the polymer. The molar ratio of epoxide groups to carboxyl groups here is preferably greater than or equal to 2:1 and more preferably greater than or equal to 4:1.

The excess of epoxide groups ensures that the carboxyl groups of the polymer are reacted completely, resulting in improved storage stability for the product and also in an improvement in the physical properties.

As already elucidated above, the modification may take place by the polyurethane polymer containing blocked isocyanate groups, in a mixture with the polymer containing carboxyl groups, preferably a carboxyl-terminated butadiene/acrylonitrile copolymer, being reacted with the epoxy resin, or by the reaction product of the at least one epoxy resin with the polyurethane polymer containing blocked isocyanate groups being subsequently reacted with the polymer containing carboxyl groups, preferably a carboxyl-terminated butadiene/acrylonitrile copolymer.

Where the reaction of the reaction product with the polymer containing carboxyl groups is to take place, the resulting reaction mixture with the reaction product can be reacted, without further processing, with the polymer containing carboxyl groups.

The reaction with the polymer containing carboxyl groups takes place typically at relatively high temperatures, e.g., at least 90° C., preferably in the range from 100 to 120° C. Additional catalysts for the reaction are optionally used. Suitable catalysts here again, for example, are phosphines, such as TPP, for example. The reaction time may be situated for example in a period from 2 to 7 h. The reaction is monitored via titration of epoxide.

In reaction scheme 3 below, a reaction product between the resultant reaction product and a carboxyl-terminated polymer, or the reaction product modified with the carboxyl-terminated polymer, is illustrated schematically. The reaction product is the reaction product with diglycidyl ether of bisphenol A (BADGE) as epoxy resin.

Reaction scheme 3

The place holders R, X, and Y are defined here as in reaction scheme 1. $R_6$ is the divalent radical of a carboxyl-terminated butadiene/acrylonitrile copolymer after removal of the terminal carboxyl groups. $R_3$, $R_4$, and $R_5$ provide a simplified representation of the remainder of the polymer chain or the remainder of the epoxy resin molecule.

The polymer obtained as described above, i.e., the reaction product of the at least one epoxy resin with the polyurethane polymer containing blocked isocyanate groups, which was optionally additionally modified at least partially with a polymer containing carboxyl groups, comprises epoxide groups. This polymer may likewise be used as it is, without further processing, as an impact modifier in epoxy resin compositions, as elucidated in detail later on. These reaction products with epoxy resins combine the high flexibilization as impact modifier with high reactivity toward the epoxide matrix when they are used in epoxy resin compositions.

Impact modifiers are understood generally to be substances or compounds which are used in a polymer matrix in order to endow that polymer matrix with the capacity, or to enhance the capacity of that polymer matrix, to absorb strike and impact energy without fracturing or suffering other damage.

The polymers of the invention are used in epoxy resin compositions, into which these polymers are able to incorporate by reaction during the curing of the epoxy resin compositions. Under the curing conditions for the epoxy resin composition, the polyurethane polymer containing blocked isocyanate groups eliminates the protective group, as described. The isocyanate groups liberated accordingly are able to react with the hydroxyl groups of the epoxy resin, or with the hardener, such as dicyandiamide (Dicy), in the end formulation.

In a further aspect, the invention proceeds from a one- or two-component epoxy resin composition comprising
a) at least one polymer as described above, which is a polyurethane polymer containing blocked isocyanate groups, or a reaction product of the polyurethane polymer containing blocked isocyanate groups with at least one epoxy resin, the reaction product being optionally modified with a polymer containing carboxyl groups, more particularly a carboxyl-terminated butadiene/acrylonitrile copolymer;
b) at least one epoxy resin; and also
c) at least one hardener for epoxy resins.

The polymer of the invention, which is used as an impact modifier in the one- or two-component epoxy resin composition, has been described above. Mixtures of different polymers of the invention may optionally also be used.

The fraction of the polymer of the invention is preferably 10 to 50 wt %, more preferably 20 to 40 wt %, based on the total weight of the one- or two-component epoxy resin composition without filler fraction, i.e., without the weight of any fillers present in the the one- or two-component epoxy resin composition.

The epoxy resin composition may be one-component (1K) or two-component (2K). In the case of the one-component epoxy resin composition, all of the constituents are in a mixture in one component, whereas with the two-component epoxy resin composition the constituents are divided into two separate components, which are not mixed with one another until before use. 1K and 2K epoxy resin compositions are extremely familiar to the person skilled in the art and are available in large numbers commercially. Statements about the epoxy resin composition always relate both to the one-component and to the two-component epoxy resin composition, unless expressly indicated otherwise.

The epoxy resin may for example be at least one solid epoxy resin or at least one liquid epoxy resin, or a mixture of at least one solid epoxy resin and at least one liquid epoxy resin. Optionally it is also possible for at least one novolac epoxy resin to be used as epoxy resin; generally, however, a novolac epoxy resin is used in combination with at least one solid epoxy resin and/or with at least one liquid epoxy resin. In one preferred embodiment the epoxy resin comprises or is at least one solid epoxy resin.

To the person skilled in the art it is clear that the epoxy resins used for preparing the polymers of the invention, i.e., for producing the reaction product with the epoxy resin, and the epoxy resins which are used in the epoxy resin composition, may be selected independently of one another.

Especially suitable solid epoxy resins are solid epoxy resins of the formula (III), which have already been described above, a description to which reference is hereby made.

Preferred solid epoxy resins have a glass transition temperature $T_G$ of ≥25° C., more particularly of ≥30° C. They can be prepared typically from the reaction of compounds of the formula HO—D—OH with epichlorohydrin and/or 2-methyl-epichlorohydrin, where D is defined as already described above in the formula (III); in practice, generally, from bisphenol A diglycidyl ether (A-resin) and BPA.

Solid epoxy resins of this kind are available commercially, for example, under the trade name Araldite® GT 7071 or Araldite® GT 7004 from Huntsman International, LLC, USA. Other suitable solid epoxy resins are available commercially, for example, from The Dow Chemical Company, USA, or from Hexion Specialty Chemicals Inc, USA.

Furthermore, modified solid epoxy resins, especially fatty acid-modified solid epoxy resins, may be used, of the kind available commercially, for example, under the trade name Araldite® GT 6404 from Huntsman International, LLC, USA.

The fraction of the solid epoxy resin is preferably 30 to 90 wt %, more particularly 35 to 85 wt %, more preferably 40 to 75 wt %, based on the total weight of the one- or two-component epoxy resin composition.

Liquid epoxy resins that are suitable are, in particular, liquid epoxy resins of the formula (IV), which have already been described above, a description to which reference is hereby made. Where liquid epoxy resins are used as a principal component of the epoxy resin, the fraction of the liquid epoxy resin may preferably be 10 to 70 wt %, more particularly 15 to 65 wt %, more preferably 20 to 60 wt %, based on the total weight of the one- or two-component epoxy resin composition.

Generally speaking, however, it is preferred for at least one solid epoxy resin to be used as principal component of the epoxy resin, preferably in the quantities indicated above. In these cases, liquid epoxy resin is used additionally, if at all, preferably in much smaller amounts, as indicated below.

Additionally, moreover, the epoxy resin composition may comprise at least one novolac epoxy resin, which has already been described above, a description to which reference is hereby made.

Where at least one solid epoxy resin is used as a principal component of the epoxy resin, preferably in the fractions indicated above, it is preferred for the fraction of the liquid epoxy resin or of the phenolic resin to be preferably 0.1 to 20 wt %, preferably 0.1 to 15 wt %, more particularly 0.1 to 5 wt %, based on the total weight of the one- or two-component epoxy resin composition.

The epoxy resin composition further comprises, in particular, at least one hardener for epoxy resins. The hardener comprises, in particular, groups that are reactive toward epoxide groups, and is preferably in blocked form or in crystalline form as a compound of low solubility in epoxides. The hardener is activated preferably by elevated temperature.

Examples of suitable hardeners are amines such as aliphatic, cycloaliphatic, aromatic or araliphatic, preferably primary or secondary, amines and polyamines; adducts and polyalkoxylation products of polyamines; amine-terminated polyalkylene glycols; polyphenols such as phenol novolacs or cresol novolacs, adducts of monophenols or polyphenols with polyamides; polyamides, especially those deriving from aliphatic polyamines and dimerized or trimerized fatty acids; polysulfides; aniline-formaldehydes; polyhydric phenols; polybasic carboxylic acids and their anhydrides.

Preferred hardeners are selected from the group consisting of dicyandiamide, guanamine, guanidine, aminoguanidine, and derivatives thereof. With particular preference the hardener is dicyandiamide.

Additionally possible are hardeners with accelerating activity, such as substituted ureas, as for example 3-(3-chloro-4-methylphenyl)-1,1-dimethylurea (chlorotoluron), N,N-dimethylurea or phenyl-dimethylureas, especially 3-(p-chlorophenyl)-1,1-dimethylurea (monuron), 3-phenyl-1,1-dimethylurea (fenuron) or 3-(3,4-dichlorophenyl)-1,1-dimethylurea (diuron). It is also possible to use compounds from the class of the imidazoles, imidazolines, and amine complexes.

The hardener is used preferably in an approximately stoichiometric amount relative to the epoxide groups in the epoxy resin composition. The molar ratio of the epoxide groups to the active hydrogen of the hardener is preferably 0.8 to 1.2, more particularly 0.9 to 1.1, more preferably 0.95 to 1.05. The fraction of the hardener is preferably 0.05 to 30 wt %, more particularly 0.1 to 15 wt %, preferably 0.2 to 5 wt %, based on the total weight of the one- or two-component epoxy resin composition.

In one preferred embodiment the epoxy resin composition is a foamable epoxy resin composition. In this case the epoxy resin composition may further comprise at least one chemical or physical blowing agent.

Chemical blowing agents are those organic or inorganic substances which form or give off gaseous substances under influence of temperature, moisture, electromagnetic radiation, or chemicals. Examples of such substances are azodicarbonamides, sulfohydrazides, hydrogencarbonates or carbonates.

Physical blowing agents which can be used are compounds which go into the gaseous aggregate state on change in temperature, in pressure or in volume, for example, especially on raising of the temperature, and so form a foam structure by volume expansion. Such physical blowing agents are more particularly liquids which evaporate at elevated temperature. Other physical blowing agents which can be used are gases or low-boiling liquids which are introduced in microencapsulated form into the composition. Both chemical and physical blowing agents are capable of generating foam structures in polymer compositions.

Preferred blowing agents are chemical blowing agents which lead to foaming of the composition under the influence of temperature. The heat required for foaming in this case may be introduced by external heat sources such as storage in an oven, contacting with electrical heating elements, microwave radiation, induction heating, and the like, for example, or may be introduced by internal heat sources such as through an exothermic chemical reaction, for example.

Suitable blowing agents are, for example, available commercially under the trade name Expancel® from Akzo Nobel, The Netherlands, under the trade name Celogen® from Chemtura Corp., USA, or under the trade name Luvopor® from Lehmann & Voss & Co. KG, Germany.

The composition may further optionally comprise additional solid toughness improvers. A "toughness improver" is understood here and below to refer to an addition to an epoxy resin matrix that produces a significant increase in toughness even at low levels added of 0.1 to 15 wt %, more particularly of 0.5 to 8 wt %, based on the total weight of the epoxy resin composition, and is therefore capable of absorbing relatively high flexural, tensile, impact or collision stress before the matrix tears or fractures.

Examples of solid toughness improvers of this kind are organic, ion-exchanged layered minerals of the kind known to the person skilled in the art by the terms organoclay or nanoclay; block copolymers, especially those of the monomers styrene, butadiene, acrylonitrile, and methyl methacrylate; amorphous silicon dioxide; or core-shell polymers. A core-shell polymer may be used with preference as a solid toughness improver.

Core-shell polymers consist of an elastic core polymer and a rigid shell polymer. Particularly suitable core-shell polymers consist of a core of elastic acrylate polymer or butadiene polymer, surrounded by a rigid shell of a rigid thermoplastic polymer.

Preferred core-shell polymers are those known as MBS polymers, which are available commercially under the trade name Clearstrength® from Arkema, Inc., USA, Paraloid® from Rohm and Haas Co., USA, or F-351™ from Zeon Chemicals L.P., USA.

Particular preference is given to core-shell polymer particles already in the form of dried polymer latex. Examples of such are GENIOPERL® M23A from Wacker Chemie AG, Germany, with polysiloxane core and acrylate shell; radiation-crosslinked rubber particles of the NEP range, produced by Eliokem, Inc., USA, or Nanopren® by Lanxess AG, Germany, or Paraloid® EXL by Rohm and Haas Co., USA. Further, comparable examples of core-shell polymers are available under the trade name Albidur® from Nanoresins AG, Germany.

The fraction of the solid core-shell polymer is advantageously 0.1 to 15 wt %, preferably 0.1 to 8 wt %, more particularly 0.1 to 5 wt %, based on the total weight of the epoxy resin composition.

The epoxy resin composition may further optionally comprise, additionally, at least one filler. This is preferably a filler selected from the group consisting of carbon black, mica, talc, kaolin, wollastonite, feldspar, syenite, chlorite, phyllosilicates such as, for example, bentonites or montmorillonites, calcium carbonate (precipitated or ground), dolomite, quartz, silicas (pyrogenic or precipitated), cristobalite, calcium oxide, aluminum hydroxide, magnesium oxide, hollow ceramic beads, hollow glass beads, hollow organic beads, glass beads, color pigments, glass fibers, polymeric fibers, and carbon fibers. By filler is meant not only the organically modified but also the untreated commercially available forms known to the person skilled in the art.

The fraction of the filler is advantageously 3 to 50 wt %, preferably 5 to 40 wt %, more particularly 8 to 35 wt %, based on the total weight of the one- or two-component epoxy resin composition.

The epoxy resin composition may further optionally comprise unreactive thermoplastic polymers, such as, for example, homopolymers or copolymers of unsaturated monomers, more particularly of unsaturated monomers, which are selected from the group consisting of ethylene, propylene, butylene, isobutylene, isoprene, vinyl acetate or higher esters thereof, and (meth)acrylate, particular suitability being possessed by ethylene-vinyl acetate copolymers (EVA), atactic poly-α-olefins (APAO), polypropylenes (PP), and polyethylenes (PE). Other suitable unreactive thermoplastic polymers are polyesters, polyamides, polystyrene, polymethyl methacrylate, thermoplastic polyurethanes or polyether esters of the kind, for example, available commercially under the trade name Hytrel® from DuPont, USA.

The epoxy resin composition may optionally comprise further constituents, examples being catalysts, reactive diluents, heat stabilizers and/or light stabilizers, thixotropic agents, plasticizers, solvents, dyes and/or pigments.

Prior to full curing, the epoxy resin compositions of the invention may be in a pastelike form, for example, or else in solid form. The curing of the epoxy resin compositions takes place, as usual, at room temperature or elevated temperature, with formation of the cured epoxy resin; preferably there is a heat cure. In the case of the foamable epoxy resin compositions, foam formation occurs before and/or in the course of curing, to form a foamed cured epoxy resin, more particularly a structural foam.

The epoxy resin compositions of the invention are suitable, for example, as adhesives, as sealants or as compositions for producing coatings, particularly as structural adhesives. With particular preference the epoxy resin compositions are suitable as 1K structural adhesives, 2K adhesives, and foamable compositions for structural foams.

The epoxy resin compositions of the invention are further suitable as foamable, heat-curing compositions which are used as structural foams in bulkhead parts for sealing and/or sound insulation or as reinforcing parts for reinforcement in cavities of structural components and reinforcing elements, especially in vehicle construction. Suitable substrates in this case are, in particular, metallic surfaces. The person skilled in the art knows of such systems under the terms "baffle" and "reinforcer".

For use as foamable material in particular, more particularly as foamable, heat-curing material, for baffle and reinforcer applications, the epoxy resin compositions of the invention have proven particularly advantageous, since they exhibit very good adhesion to metallic surfaces, and in their aging behavior they exhibit a general boost to the resistance toward corrosion, especially toward underfilm corrosion.

Figure 1:
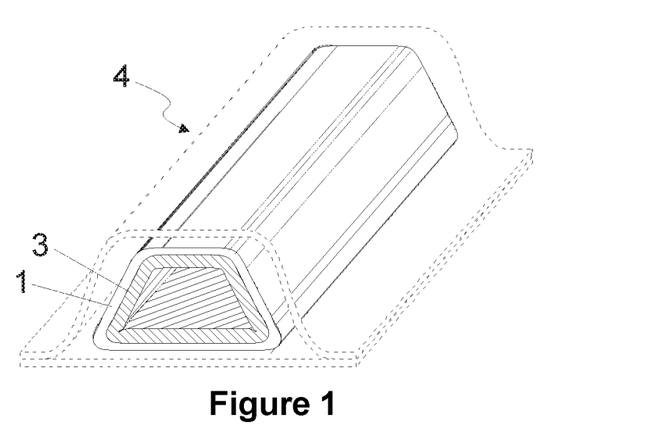
FIG. 1 shows a diagrammatic representation of a reinforcing component prior to foaming.
Figure 2:
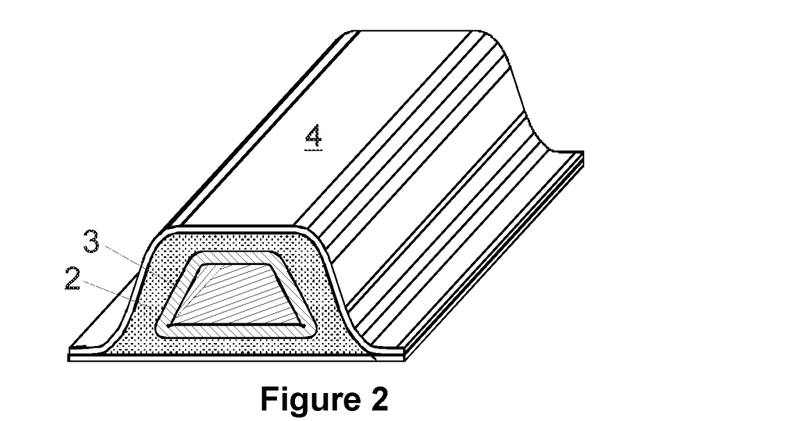
FIG. 2 shows a diagrammatic representation of a reinforcing component after foaming.

FIGS. 1 and 2 show, schematically, an example of such an application of the present invention in accordance with the description above.

FIG. 1 shows a reinforcer as used in a cavity of a structural component 4, prior to the foaming of the epoxy resin composition 1, which in this embodiment is foamable and which is located on a support component 3. In vehicle construction, such reinforcers are used in the assembly of the bodywork at points which are later on subject to particularly high loads, and are attached to the bodywork by means of a clip or the like, for example. When the cathodic electrodeposition coating (CEC) is cured in an oven, the foamable composition foams, bonds to the component, and then cures.

FIG. 2 shows a reinforcer as used in a cavity of a structural component 4. The foamable material 2 comprising the epoxy resin composition is in this case already fully foamed, completely filling the cavity between the support component 3 and the structural component 4.

In a further aspect, the present invention embraces the use of the above-described polymers as impact modifiers in a one- or two-component epoxy resin composition.

The composition and the possible uses of the one- or two-component epoxy resin composition of the invention have already been described above, a description hereby referenced. As stated, the suitable use is particularly for epoxy resin compositions which are used as adhesive or foamable epoxy resin composition, more particularly as 1K structural adhesives, 2K adhesives, and foamable compositions for structural foams.

The inventive use of the polymers in the epoxy resin composition is also suitable, in particular, for improving the corrosion resistance of the bonded assembly between substrate and the epoxy resin composition applied thereon and cured. This relates to the integrity of attachment between a substrate, more particularly a metallic substrate, and the epoxy resin composition applied thereto and cured. The corrosion which occurs over time in the region between the substrate surface and the epoxy resin composition ("subfilm corrosion") may weaken the adhesive bond and result in adhesive fracture of the bonded assembly.

The corrosion resistance may be determined, for example, by the drop in tensile shear strength after 7-day storage under hot and humid conditions. The reduced drop in adhesion in the case of the inventive examples is attributable to the lower subfilm corrosion and hence an improved corrosion resistance.

Where the epoxy resin composition comprises blowing agents or is a foamable epoxy resin composition, the inventive use of the polymers in the epoxy resin composition is also suitable, surprisingly, for improving the vertical expansion of the epoxy resin composition.

Increased vertical expansion is advantageous because in that case less blowing agent is needed in the epoxy resin composition in order to fill the desired gap or cavity, and greater stability is achieved.

EXAMPLES

Abbreviations
MW average molecular weight
m.p. melting point
OHN OH number
AN acid number
BPA bisphenol A
EEW epoxide equivalent weight All quantity figures relate to parts by weight unless otherwise stated.

Products/compounds used in the examples were as follows

| | | |
|---|---|---|
| PTHF 650 | Polyether, Polytetrahydrofuran, Mw: 625-675 g/mol | BASF |
| Dynacoll ®7330 | Semicrystalline polyester polyol, MW: 3500, m.p. 85° C., OHN: 27-34 mgKOH/g, AN: <2 mgKOH/g | Evonik Industries |
| Dynacoll ®7331 | Semicrystalline polyester polyol, MW: 3500, m.p. 110° C., OHN: 27-34 mgKOH/g, AN: <2 mgKOH/g | Evonik Industries |
| Dynacoll ®7490 | Polyester polyol | Evonik Industries |
| Dynacoll ®7340 | Semicrystalline polyester polyol, MW: 3500, m.p. 96° C., OHN: 27-34 mgKOH/g, AN: <2 mgKOH/g | Evonik Industries |
| EP431.01 | Polyester polyol, m.p. 110° C., OHN: 30 mgKOH/g, AN: 0.3 mgKOH/g (experimental product) | |
| EP431.02 | Polyester polyol, m.p. 116° C., OHN: 28 mgKOH/g, AN: 0.9 mgKOH/g (experimental product) | |
| IPDI | Isophorone diisocyanate | |
| Hypro X13 | HYPRO ® CTBN 1300X13, liquid rubber, COOH-terminated butadiene/acrylonitrile copolymer | Emerald |
| GT 7071 | Araldite ® GT 7071, solid BPA epoxy resin | Huntsman |
| GT 7004 | Araldite ® GT 7004, solid BPA epoxy resin | Huntsman |
| DEN 431 | D.E.N. ®431, epoxy-novolac resin | Dow |
| DEN 438 | D.E.N. ®438, epoxy-novolac resin | Dow |
| BFDGE | Diglycidyl ether of bisphenol F, liquid epoxy resin | |
| BADGE | Diglycidyl ether of bisphenol A, liquid epoxy resin | |
| PPh3 | Triphenylphosphine | |
| DBTL | Dibutyltin dilaurate | |
| Cardolite NC700 | 3-Pentadecenylphenol (from cashew nut shell oil) | Cardolite Corporation |
| Bisphenol-A | 2,2-Bis(4-hydroxyphenyl)propane | |
| Dicy | Dicyandiamide | |
| Fiber | Reinforcing fiber | |
| Luvopor | Luvopor OB, blowing agent | Lehmann & Voss & Co. |
| SiO2 | Fumed silica, thixotropic agent | |
| CaCO3 | Calcium carbonate, filler | |
| Talc | Talc, filler | |
| GHK | Hollow glass beads, for weight reduction | |
| Expancel | Expancel 950 DU120, physical blowing agent | AkzoNobel |
| Kat1 | Catalyst for Dicy | |

Preparation of Polymers P1 to P12

For preparation of the polymers P1 to P12, the compounds indicated in table 1 were used in the weight fractions reported. The stated polyester polyol was used as polymer P1. The experimental procedure is indicated below by way of example for example P6.

Preparation Process, Polymer P6

Stage 1:

375 g of the polyester (Dynacoll 7330) were melted and were mixed with 51.47 g of polyisocyanate (IPDI) in a reaction vessel. The catalyst (DBTL) was added (0.148 g) and the mixture was heated at 120° C. with stirring for 90 minutes. The NCO content then measured was 2.38% (theory: 2.37%). At this point the phenol (bisphenol A) can be added (66.03 g) and the temperature was raised again with stirring to 140° C. After 6 hours the free NCO content was again determined (result: 0.13%). The reaction was at an end, and 492.5 g of the polymer were obtained. This polymer was discharged and cooled to room temperature.

Stage 2:

150 g of the polymer from stage 1 were heated with 100 g each of Hypro X13 CTBN (COON-term. polymer) and 100 g of Cardolite NC700, and also with epoxy resin (300 g each of DEN 438 and GT7071), with addition of 0.5 g of catalyst (triphenylphosphine), with stirring at 120° C. for 8.5 h. Thereafter an epoxy number of 1.72 g/mol was measured and the reaction was at an end. The polymer was discharged and cooled to room temperature.

Polymers P2 to P5 and polymers P7 to P12 were prepared similarly to the polymer P6 using the components specified in table 1; for polymer P2, a polyether polyol rather than a polyester polyol was used; for polymer P3, only the first stage was carried out (no reaction with epoxy resin); for polymers P7 to P12, no catalyst (DBTL) was used in the first stage; and for polymer P11 no COOH-term. polymer was used either. For polymer P2, the Cardolite NC700 was used as blocking agent in the first stage.

TABLE 1

Preparation of prepolymers

| | P1 | P2 | P3 | P4 | P5 | P6 | P7 | P8 | P9 | P10 | P11 | P12 |
|---|---|---|---|---|---|---|---|---|---|---|---|---|
| Polyol | | | | | | | | | | | | |
| PTHF 650 | | 1.65 | | | | | | | | | | |
| Dynacoll 7330 | 100 | | 78.05 | 13.49 | 10.87 | 12.01 | | | | | | |
| Dynacoll 7331 | | | | | | | | 13.38 | | | | |
| Dynacoll 7490 | | | | | | | | | | 17 | 13.31 | |
| Dynacoll 7340 | | | | | | | 17.06 | | | | | |
| EP431.01 | | | | | | | | | | | 17.97 | |
| EP431.02 | | | | | | | | | | | | 12.15 |
| Polyisocyanate | | | | | | | | | | | | |
| IPDI | | | 10.71 | 1.85 | 1.49 | 1.65 | 2.26 | 1.69 | 2.19 | 1.71 | 2.29 | 1.45 |
| COOH-term. polymer | | | | | | | | | | | | |
| Hypro X13 | | 33.1 | | 11.76 | 9.52 | 10.52 | 22.21 | 17.38 | 22.21 | 17.38 | | 7.69 |
| Epoxy resin | | | | | | | | | | | | |
| GT 7071 | | 34.77 | | 58.78 | 76.16 | 31.56 | 27.76 | 57.95 | 27.76 | 57.94 | 76.90 | 76.89 |
| DEN 431 | | | | | | | 27.76 | 7.24 | 27.76 | 7.24 | | |
| DEN 438 | | | | | | 31.56 | | | | | | |
| BFDGE | | 17.38 | | | | | | | | | | |
| BADGE | | | | 11.76 | | | | | | | | |
| Catalyst | | | | | | | | | | | | |
| Stage 2: PPh3 | | 0.04 | — | 0.06 | 0.05 | 0.05 | 0.07 | 0.06 | 0.06 | 0.06 | 0.03 | 0.03 |
| Stage 1: DBTL | | 0.02 | 0.03 | 0.01 | 0.004 | 0.005 | | | | | | |
| Phenol | | | | | | | | | | | | |
| Cardolite NC700 | | 13.04 | | | | 10.52 | | | | | | |
| Bisphenol A | | | 11.21 | 2.29 | 1.91 | 2.12 | 2.88 | 2.3 | 3.02 | 2.36 | 2.81 | 1.79 |
| Total | 100.00 | 100.00 | 100.00 | 100.00 | 100.00 | 100.00 | 100.00 | 100.00 | 100.00 | 100.00 | 100.00 | 100.00 |
| Final EEW [mol/kg] | | | | 1.76 | 1.36 | 1.72 | 1.80 | 1.27 | 1.82 | 1.28 | 1.34 | 1.34 |

Production of Premixes VM1 to VM12

19.00 parts by weight in each case of polymers P1 to P12 were mixed with 80.00 parts by weight of solid epoxy resin GT 7004 and 1.00 part by weight of silane (Silquest® A187) to give the premixes VM1 to VM12.

Production of Compositions Z1 to Z10 and Ref1 to Ref2

The substances listed in table 2 were added to the premixes VM1 to VM12 in the weight fractions stated and were mixed in an OMC extruder to produce the inventive epoxy resin compositions Z1 to Z10 and the reference examples Ref1 and Ref2. All of the components were weighed out into the extruder, homogenized thoroughly (all raw materials are solids), and subsequently mixed.

TABLE 2

Production of epoxy resin composition and results

| | Ref. 1 | Ref. 2 | Z1 | Z2 | Z3 | Z4 | Z5 | Z6 | Z7 | Z8 | Z9 | Z10 |
|---|---|---|---|---|---|---|---|---|---|---|---|---|
| Premix VM1 | 67.37 | | | | | | | | | | | |
| Premix VM2 | | 73.03 | | | | | | | | | | |
| Premix VM3 | | | 67.37 | | | | | | | | | |
| Premix VM4 | | | | 67.18 | | | | | | | | |
| Premix VM5 | | | | | 67.14 | | | | | | | |
| Premix VM6 | | | | | | 67.19 | | | | | | |
| Premix VM7 | | | | | | | 67.16 | | | | | |
| Premix VM8 | | | | | | | | 67.22 | | | | |
| Premix VM9 | | | | | | | | | 67.15 | | | |
| Premix VM10 | | | | | | | | | | 67.22 | | |
| Premix VM11 | | | | | | | | | | | 65.91 | |
| Premix VM12 | | | | | | | | | | | | 65.91 |
| Dicy | 1.03 | 1.49 | 1.03 | 1.31 | 1.37 | 1.30 | 1.34 | 1.25 | 1.35 | 1.25 | 1.24 | 1.24 |
| Fiber | 12.80 | 13.87 | 12.80 | 12.77 | 12.76 | 12.77 | 12.76 | 12.77 | 12.76 | 12.77 | 12.53 | 12.53 |
| Luvopor | 0.34 | 0.37 | 0.34 | 0.34 | 0.34 | 0.34 | 0.34 | 0.34 | 0.34 | 0.34 | 0.33 | 0.33 |
| SiO2 | 2.69 | 5.11 | 2.69 | 2.69 | 2.69 | 2.69 | 2.69 | 2.69 | 2.69 | 2.69 | 2.64 | 2.64 |
| CaCO3 | 3.37 | 3.65 | 3.37 | 3.36 | 3.36 | 3.36 | 3.36 | 3.36 | 3.36 | 3.36 | 3.30 | 3.30 |

TABLE 2-continued

Production of epoxy resin composition and results

|  | Ref. 1 | Ref. 2 | Z1 | Z2 | Z3 | Z4 | Z5 | Z6 | Z7 | Z8 | Z9 | Z10 |
|---|---|---|---|---|---|---|---|---|---|---|---|---|
| Talc | 2.02 | 2.19 | 2.02 | 2.02 | 2.01 | 2.02 | 2.01 | 2.02 | 2.01 | 2.02 | 1.98 | 1.98 |
| HGB | 10.11 |  | 10.11 | 10.08 | 10.07 | 10.08 | 10.07 | 10.08 | 10.07 | 10.08 | 9.89 | 9.89 |
| Expancel |  |  |  |  |  |  |  |  |  |  | 1.65 | 1.65 |
| Kat1 | 0.27 | 0.29 | 0.27 | 0.27 | 0.27 | 0.27 | 0.27 | 0.27 | 0.27 | 0.27 | 0.53 | 0.53 |
| Total | 100.00 | 100.00 | 100.00 | 100.00 | 100.00 | 100.00 | 100.00 | 100.00 | 100.00 | 100.00 | 100.00 | 100.00 |
| Results |  |  |  |  |  |  |  |  |  |  |  |  |
| ZSF H0 [MPa] | 7.44 | 3.88 | 5.77 | 7.87 | 5.92 | 5.69 | 7.66 | 7.32 | 7.97 | 7.28 | 7.67 | 7.06 |
| ZSF H7 [MPa] | 3.55 | 3.12 | 5.17 | 6.69 | 5.36 | 5.21 | 6.43 | 6.86 | 7.00 | 5.93 | 6.58 | 5.98 |
| Drop in ZSF [%] | −52 | −20 | −10 | −15 | −9 | −8 | −16 | −6 | −12 | −19 | −14 | −15 |
| d before curing [mm] | 1.89 | 1.86 | 2.09 | 1.98 | 2.23 | 2.33 | 2.13 | 2.4 | 2.28 | 2.57 | 1.92 | 2.23 |
| d after curing [mm] | 3.18 | 3.15 | 4.24 | 3.58 | 3.95 | 4.73 | 4.08 | 4.22 | 4.01 | 4.58 | 4.04 | 5.19 |
| Vertical expansion [%] | 68 | 69 | 103 | 81 | 77 | 103 | 92 | 76 | 76 | 78 | 110 | 133 |

Test Methods
Drop in Tensile Shear Strength

The tensile shear strength (ZSF) was determined by the method of ISO 4587/DIN EN 1465 on a Zwick/Roell Z005 tensile machine, with two identical substrates being bonded to one another in each case (bond area: 25×20 mm; layer thickness: 2 mm; measuring velocity: 10 mm/min; substrates: hot dip galvanized steel G1010 (HLE, HE450M), 100×25×1.8 mm; curing: 30 min at 180° C.; measuring temperature: 23° C.

The first measurement of the tensile shear strength (ZSF H0) was carried out after curing after 30 minutes at 180° C. of the composition. A second measurement (ZSF H7) was carried out after storage of the test specimen for 7 days at 70° C. and 100% relative humidity (hot and humid storage). The change in the tensile shear strength after hot and humid storage (ZSF H7) in relation to the tensile shear strength after curing (ZSF H0) is expressed in % (drop in ZSF). The results are shown in table 2.

Vertical Expansion

The epoxy resin composition was applied to a substrate and the layer thickness was determined (d before curing). Thereafter the coating was cured and expanded. Curing took place at 180° C. for 30 minutes. The layer thickness after curing was determined (d after curing). Thickness measurement before and after expansion and curing took place using a caliper gage. Vertical expansion was determined as the percentage increase in the thickness of the applied epoxy resin composition after curing as compared with the thickness of the applied composition prior to curing. The results are shown in table 2.

Results

All inventive formulations exhibit higher mechanical values in conjunction with greater expansion. The drop in the tensile shear strength is much lower for the inventive examples, and the vertical expansion is greater. The reduced drop in adhesion is attributable to reduced subfilm corrosion.

LIST OF REFERENCE NUMERALS 1 foamable composition
2 foamed composition
3 support material
4 structural component

The invention claimed is:

1. A one or two component epoxy resin composition, comprising:
   at least a first epoxy resin;
   at least one hardener for the first epoxy resin;
   a blowing agent; and
   at least one polymer as impact modifier,
   wherein the polymer is a reaction product of a polyurethane polymer containing blocked isocyanate groups with at least a second epoxy resin different from the first epoxy resin, and
   where the polyurethane polymer containing blocked isocyanate groups is an adduct of at least one polyisocyanate and at least one polyester polyol, the isocyanate groups of the adduct being blocked by reaction with at least one aromatic compound which contains at least one hydroxyl group.

2. The one or two component epoxy resin composition according to claim 1, wherein the at least one polyester polyol is formed from at least one $C_3$-$C_{12}$ diol and at least one aliphatic or aromatic $C_3$-$C_{15}$ dicarboxylic acid or methyl ester thereof.

3. The one or two component epoxy resin composition according to claim 1, where the at least one polyester polyol has an average molecular weight in the range from 1000 to 10 000 g/mol.

4. The one or two component epoxy resin composition according to claim 1, where the blocked isocyanate groups of the adduct are blocked by reaction with at least one aromatic compound which contains one or two phenolic OH groups.

5. The one or two component epoxy resin composition according to claim 1, where the second epoxy resin is at least one resin selected from the group consisting of a solid epoxy resin, a liquid epoxy resin, and a novolac epoxy resin.

6. The one or two component epoxy resin composition according to claim 1, where the reaction product of at least one epoxy resin with at least one polyurethane polymer containing blocked isocyanate groups is additionally modified at least partially with a polymer containing carboxyl groups.

7. The one or two component epoxy resin composition according to claim 1, where the at least one aromatic compound which contains at least one hydroxyl group is selected from the group consisting of phenol, cresol, p-tert-butylphenol, 3-pentadecenylphenol, nonylphenol, hydroquinone monomethyl ether, p-hydroxybenzoic acid, benzyl alcohol, hydroxybenzyl alcohol, bisphenols, and diphenols.

8. The one or two component epoxy resin composition according to claim 1, wherein the polymer is obtained by a process comprising the steps of:

a) reacting the at least one polyisocyanate with the at least one polyester polyol, optionally in the presence of a catalyst, to give an adduct in the form of a polyurethane polymer containing isocyanate groups,
b) reacting the polyurethane polymer containing isocyanate groups with at least one aromatic compound which contains at least one hydroxyl group, to block the isocyanate groups, and
c) reacting the polyurethane polymer containing blocked isocyanate groups with the second epoxy resin, optionally in the presence of a catalyst,
where optionally the reaction in step c) takes place in the presence of a polymer containing carboxyl groups or the reaction product obtained in step c) is reacted with a polymer containing carboxyl groups.

9. A method, comprising:
applying the one or two component epoxy resin composition according to claim 1 to a surface of a substrate or to at least a portion of a cavity of a structural component; and
curing the one or two component epoxy resin composition to form an adhesive layer on the surface of the substrate or to form a foam that fills the cavity of the structural component.

* * * * *